United States Patent
Lim et al.

(10) Patent No.: US 8,569,912 B2
(45) Date of Patent: Oct. 29, 2013

(54) PARALLELING OF TWO TRANSFER SWITCHES

(75) Inventors: Sie Teong Lim, Brookfield, WI (US); Robert Jeffery Hurd, Sr., Oconomowoc, WI (US); Kenny J. Stair, North Prairie, WI (US); Brandon Michael Batzler, Hartford, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 463 days.

(21) Appl. No.: 13/008,083

(22) Filed: Jan. 18, 2011

(65) Prior Publication Data

US 2012/0181872 A1 Jul. 19, 2012

(51) Int. Cl.
*H02J 1/00* (2006.01)
(52) U.S. Cl.
USPC .............................................. 307/42; 307/38
(58) Field of Classification Search
USPC ....................................................... 307/38, 42
See application file for complete search history.

(56) References Cited

U.S. PATENT DOCUMENTS

| | | |
|---|---|---|
| 4,177,389 A | 12/1979 | Schott |
| 5,635,772 A | 6/1997 | Lagree et al. |
| 6,137,191 A | 10/2000 | O'Leary et al. |
| 6,331,798 B1 | 12/2001 | O'Leary et al. |
| 6,465,912 B1 | 10/2002 | Nakamura et al. |
| 6,747,369 B2 | 6/2004 | Griffith et al. |
| 6,876,103 B2 | 4/2005 | Radusewicz et al. |
| 7,015,599 B2 | 3/2006 | Gull et al. |
| 7,692,332 B2 | 4/2010 | Nordman et al. |
| 2004/0070278 A1 | 4/2004 | Divan et al. |
| 2008/0080104 A1 | 4/2008 | Yagudayev et al. |

*Primary Examiner* — Robert L. Deberadinis
(74) *Attorney, Agent, or Firm* — Andrus, Sceales, Starke & Sawall, LLP

(57) ABSTRACT

A backup power management system connectable to a primary power source and a secondary power source, and a method of operating the same. The system includes a single controller that is connected to both a first transfer switch contactor and a second transfer switch contactor. Both the primary power source and a secondary power source are broken into two separate output supplies. The two separate output supplies from the primary power source and the secondary power source are each provided to one of the first and second transfer switch contactors. The single controller sends signals to the first and second transfer switch contactors to control the movement of the contactors between first and second positions. In this manner, the single controller controls both the first transfer switch contactor and the second transfer switch contactor.

20 Claims, 5 Drawing Sheets

PARALLELING OF TWO TRANSFER SWITCHES

BACKGROUND OF THE DISCLOSURE

The present disclosure generally relates to backup power supply systems. More specifically, the present disclosure relates to a transfer switch for use in a backup power supply system that includes a pair of transfer switch contactors that are controlled by a single controller.

BACKGROUND OF THE INVENTION

Backup power supply systems typically include a generator that is connected to a transfer switch. When the transfer switch determines that a primary power source, such as a utility power supply, has been interrupted, a controller in the transfer switch determines whether a secondary power source, such as a standby generator, is operating. If the secondary power source is operating and providing an acceptable level of current and voltage, a controller in the transfer switch causes a transfer switch contactor to connect the secondary power source to a distribution panel for the building or home being serviced by the primary source.

In a business or residence serviced by a 400 amp utility power supply, currently available systems include either two separate 200 amp transfer switches, each of which include a transfer switch controller, or a single 400 amp transfer switch. In the system having two 200 amp transfer switches, each transfer switch includes a separate pair of transfer switch contactors and a separate controller. In a system including a single transfer switch that can handle the 400 amp service, the transfer switch panel must be much larger, which often is unacceptable in the limited space available for the transfer switch.

SUMMARY OF THE INVENTION

The present disclosure relates to a transfer switch that controls the connection of either a primary power source or a secondary power source to a distribution panel within a building. The transfer switch includes a single controller that controls the position of a pair of transfer switch contactors.

The backup power management system of the present disclosure includes a primary power source, such as the utility power supply, that provides power to a plurality of loads located within a building. Since the primary power source requires relatively large components to handle the amount of current present, the primary power source is supplied to a splitter that divides the power from the primary power source into a first primary output and a second primary output.

Since the building normally receives the primary power source, the backup power management system is designed including a secondary power source that also provides the same value of service. The secondary power source can be various different types of backup generators, which can be either mounted in a stationary location outside of the building or, in some cases, comprise a portable generator. Since the secondary power source supplies the same service, the secondary power supply requires relatively large components. Therefore, the secondary power source is supplied to a secondary power splitter that divides the secondary power source into a first secondary output and a second secondary output.

Once the primary power source has been divided into the first primary output and the second primary output, the first primary output is supplied to a first transfer switch contactor. The second primary output is supplied to terminals of a second transfer switch contactor.

The first transfer switch contactor also receives the first secondary output from the secondary power source. The second transfer switch contactor receives the second secondary output from the secondary power source.

Both the first transfer switch contactor and the second transfer switch contactor include internal switches and/or relays that are movable between a first position and a second position. When the first and second transfer switch contactors are in the first position, the primary power source is connected to the distribution panels through the respective first or second transfer switch contactor. Likewise, when the first and second transfer switch contactors are in the second position, the secondary power source is connected to the distribution panels through the respective first and second transfer switch contactors.

A single controller is in operative communication with both the first transfer switch contactor and the second transfer switch contactor. The controller generates control signals to both the first transfer switch contactor and the second transfer switch contactor to control movement of the contactors between the first and second positions. In this manner, the single controller controls the position of the first and second transfer switch contactors to control whether the primary power source or the secondary power source is connected to the first and second distribution panels. The controller operates such that the first and second transfer switch contactors are always in the same position such that either the primary power source or the secondary power source are provided to the distribution panels.

During operation, the controller monitors for the loss of the primary power source. If the primary power source is lost for more than a brief period of time, the controller determines whether the secondary power source is activated and able to supply power to the building. If the secondary power source is active, the controller generates signals to the first and second transfer switch contactors which cause both the first and second transfer switch contactors to move from the first position to the second position. Once the first and second transfer switch contactors are in the second position, the home is supplied with power from the secondary power source.

Once the primary power source returns, the controller generates signals to the first and second transfer switch contactors to move the first and second switch contactors back to the first position. As described, when the first and second transfer switch contactors are in the first position, the primary power source is supplied to the distribution panel in the building.

In the manner described above, a single controller is used to control the position of two separate transfer switch contactors. Each of the transfer switch contactors receives a 200 amp service, which is half of the 400 amp primary power source or secondary power source. In this manner, the single controller can control both of the transfer switch contactors and the transfer switch contactors can be smaller than contactors required for 400 amp service.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION OF THE INVENTION

Figure 1:
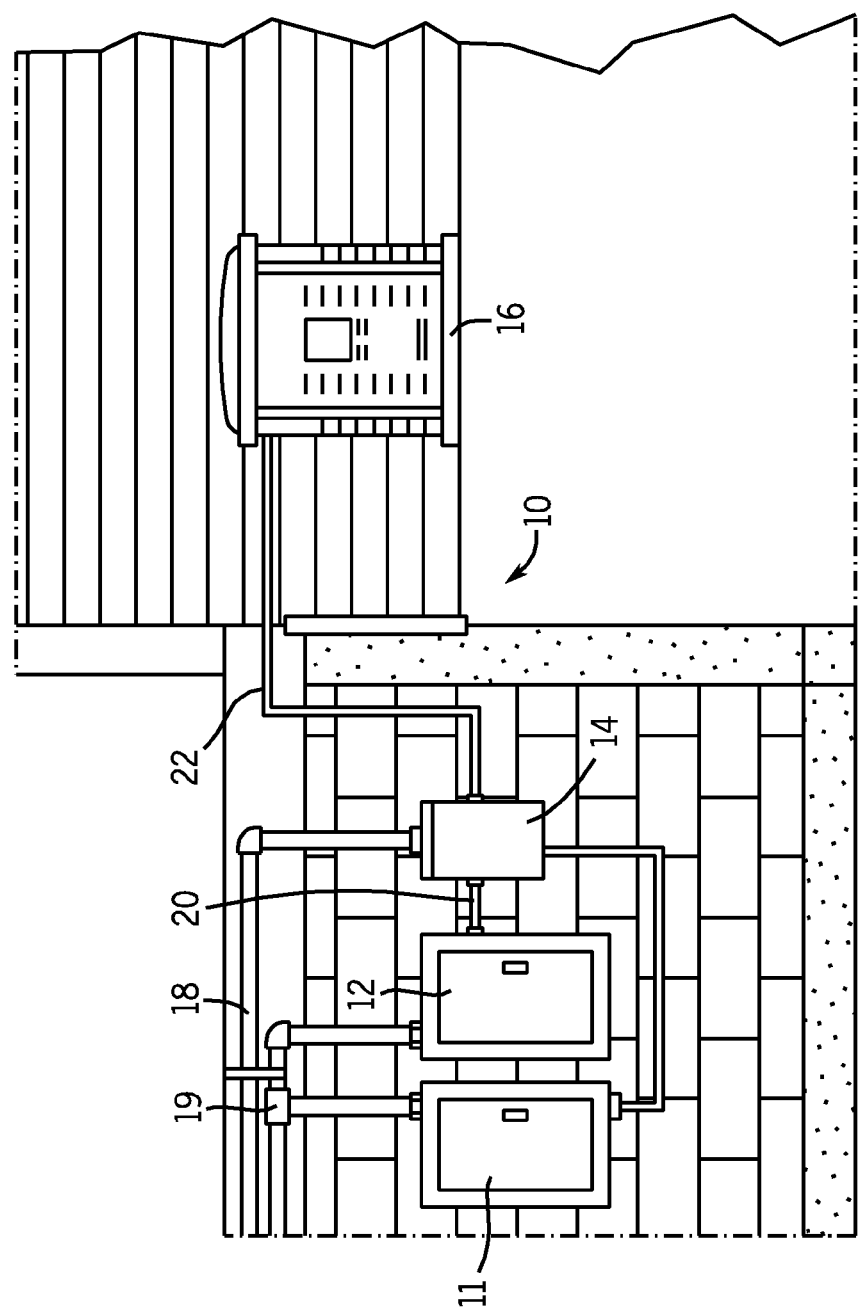
FIG. 1 illustrates a utility distribution panel and a transfer switch connected to a generator in accordance with the present disclosure.

FIG. 1 illustrates a power distribution system constructed in accordance with the present disclosure. The power distribution system 10 includes a first utility distribution panel 11, a second utility distribution panel 12, a transfer switch 14, and a generator 16. The transfer switch 14 is connected to a primary power source, such as a utility, through conduit 18. The distribution panels 11 and 12 supply power to a plurality of loads within the building through a conduit 19. The distribution panels 11 and 12 includes a plurality of circuit breakers and/or fuses that provide surge and over-current protection for non-essential loads associated with the building.

Conductors are routed between the utility distribution panels 11 and 12 and the transfer switch panel 14 within conduits 20. For example, conductors associated with a utility service (one or more hot conductors, a neutral conductor, a ground conductor) as well as conductors associated with components of the residence or other building can be routed through the conduits 20 and the load distribution panels 11 and 12 to the transfer switch panel 14 through the conduit 20. In the embodiment shown in FIG. 1, the distribution panels 11 and 12 and the transfer switch panel 14 are positioned relatively close to one another, thereby requiring a relatively short section of conduit 20. However, in other embodiments, the utility distribution panels 11 and 12 and the transfer switch panel 14 may be positioned further from each other. As an example, the transfer switch panel 14 may be positioned in an alternate area of the building, thereby requiring a longer conduit 20.

Generally, the transfer switch panel 14 includes fuses and/or circuit breakers associated with essential devices of the building. Additionally, as will be described in greater detail below, the transfer switch panel 14 includes a pair of transfer switch contactors that are operated to transfer loads from the primary power source to the secondary power source. In the embodiment shown in FIG. 1, the secondary power source is the standby generator 16 positioned outside the residence. However, the generator 16 could be a portable generator that can be relatively easily moved from one location to another. In the embodiment illustrated, the generator 16 may be of any size, depending upon the number and power requirements of the essential devices. As illustrated in FIG. 1, the transfer switch panel 14 is connected to the generator 16 through conduit 22. The conduit 22 allows the transfer switch panel 14 to monitor operation of the generator 16, receive power from the generator, and initiate operation of the generator 16 upon loss of the primary power source.

Figure 2:
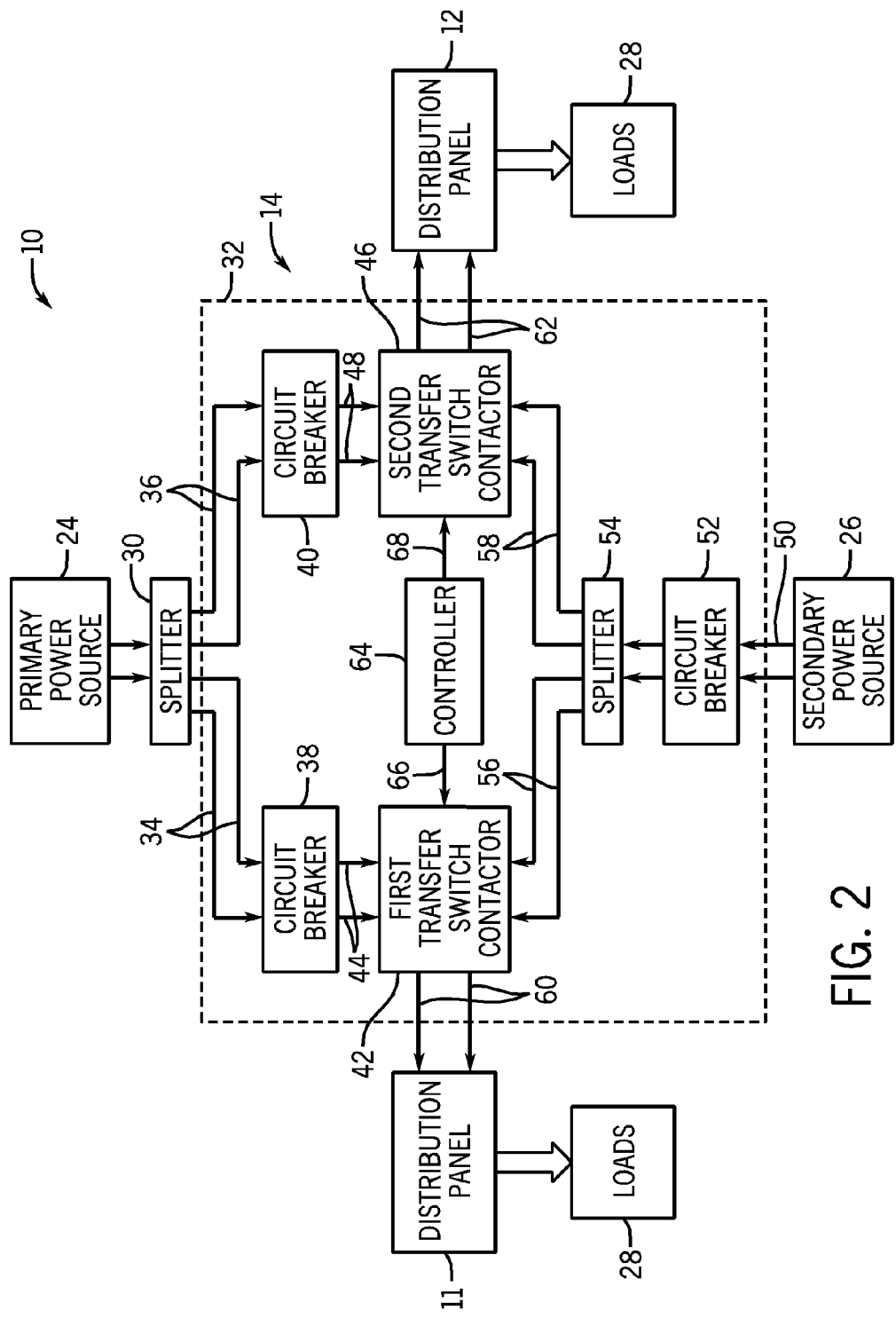
FIG. 2 is a block diagram of a backup power management system embodying the present disclosure.

FIG. 2 provides a schematic illustration of the power distribution system 10 of the present disclosure. As described previously with reference to FIG. 1, the power distribution system 10 includes a primary power source 24, a secondary power source 26 and the distribution panels 11 and 12. In the embodiment shown in FIG. 2, the distribution panels 11 and 12 are shown broken into two separate components. However, it should be understood that the distribution panels 11 and 12 could be a single panel. The distribution panels 11 and 12 feed a plurality of loads 28 distributed throughout the residence including the power distribution system 10.

In the embodiment shown in FIG. 2, the primary power source 24 is provided to a splitter 30. The splitter 30 is shown positioned outside of the transfer switch housing 32. However, it is contemplated that the splitter 30 could be located within the housing 32 while operating within the scope of the present disclosure.

The splitter 30 divides the primary power source 24 into a first primary output available along lines 34 and a second primary output available along lines 36. In the embodiment illustrated in FIG. 2, the first primary output available along lines 34 is fed into a first circuit breaker 38 while the second primary output on lines 36 is fed to a second circuit breaker 40. In the embodiment shown in FIG. 2, the circuit breakers 38, 40 are shown located within the housing 32. However, the circuit breakers 38, 40 could be located outside of the housing 32 while operating within the scope of the present disclosure.

If the first primary output along lines 34 does not trip the circuit breaker 38, the first primary output is provided to terminals of a first transfer switch contactor 42 along lines 44. Likewise, if the second primary output on lines 34 does not trip the circuit breaker 40, the second primary output is supplied to the terminals of second transfer switch contactor 46 through lines 48.

The secondary power source 26 provides power to the power distribution system 10 along input lines 50. The secondary power source 26 supplies power through a circuit breaker 52. In the embodiment shown in FIG. 2, the circuit breaker 52 is located within the housing 32 of the transfer switch 14.

If the secondary power source does not trip the breaker 52, the secondary power source is supplied to a secondary power splitter 54. Like the power splitter 30 described previously, the secondary power splitter 54 divides the power supply from the secondary power source 26 into two separate power outputs. Specifically, a first secondary output is present on lines 56 while a second secondary output is available on lines 58. The first secondary output is supplied to terminals of the first transfer switch contactor 42 while the second secondary output is supplied to terminals of the second transfer switch contactor 46.

As is known, the first transfer switch contactor 42 and the second transfer switch contactor 46 each include internal switches or relays that control which of the two input power supplies are present on the output lines 60, 62 that each feed two separate distribution panels 11 and 12. Specifically, each of the first and second transfer switch contactors 42, 46 are movable between a first position and a second position. When the transfer switch contactors 42, 46 are in the first position, the primary power source 24 is supplied to the distribution panel 12 through the transfer switch contactors 42, 46. When the transfer switch contactors 42, 46 are in the second position, the secondary power source 26 is supplied to the distribution panels 11 and 12. Thus, the position of the transfer switch contactors 42, 46 controls whether the primary power source 24 or the secondary power source 26 are supplied to the distribution panels 11 and 12.

In the embodiment shown in FIG. 1, the transfer switch 14 includes a single controller 64 that is operatively connected to both the first transfer switch contactor 42 and the second transfer switch contactor 46. The single controller 64 monitors for whether the primary power source 24 is available. If the primary power source 24 is disrupted, the single controller 64 generates activation signals along lines 66 and 68 to control the position of the first and second transfer switch contactors 42, 46. As an illustrative example, if the controller 64 determines that the primary power source 24 has become disrupted, the controller 64 generates a signal along line 66 to cause the first transfer switch contactor 42 to move to the second position such that the secondary power source 26 is supplied to the first distribution panel 11. At the same time, the controller 64 generates a signal along line 68 to the second transfer switch contactor 46 which moves the second switch contactor 46 to the second position, thereby causing the secondary power source 26 to be supplied to the second distribution panel 12.

When the primary power source 24 returns, the controller 64 again generates signals along lines 66 and 68 to move both the first transfer switch contactor 42 and the second transfer switch contactor 46 back to the first position such that the primary power source 24 is supplied to the distribution panels 11 and 12. In this manner, the single controller 64 controls both the first transfer switch contactor 42 and the second transfer switch contactor 46. In prior systems, a separate transfer panel including its own controller was required to control the movements of the separate transfer switch contactors. In accordance with the present disclosure, the single controller 64 is included within the housing 32 along with the first transfer switch contactor 42 and the second transfer switch contactor 46. Thus, the single controller 64 can control the operation of both of the contactors 42, 46.

Figure 3:
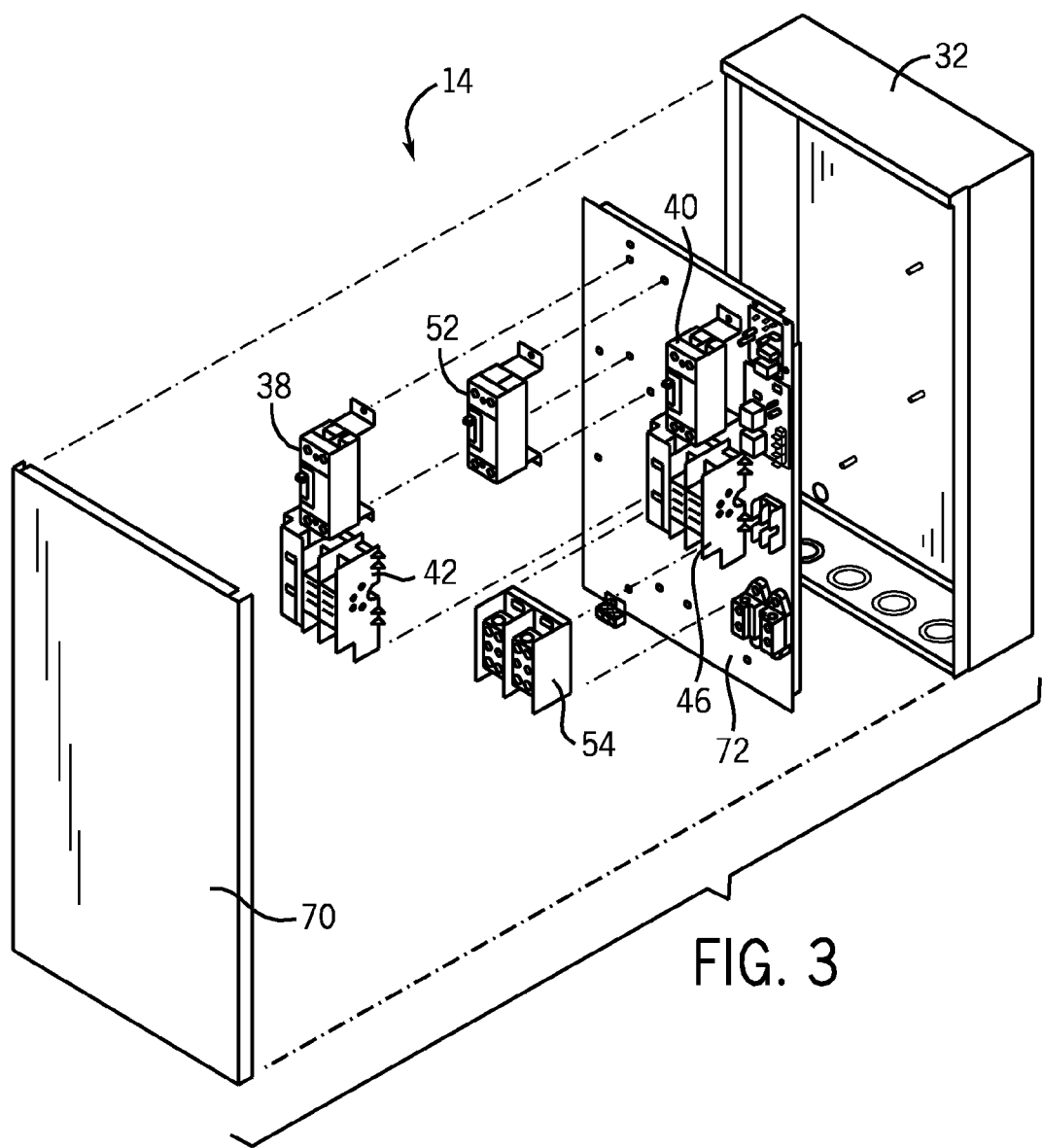
FIG. 3 is an exploded perspective view of a transfer switch of the present disclosure.
Figure 4:
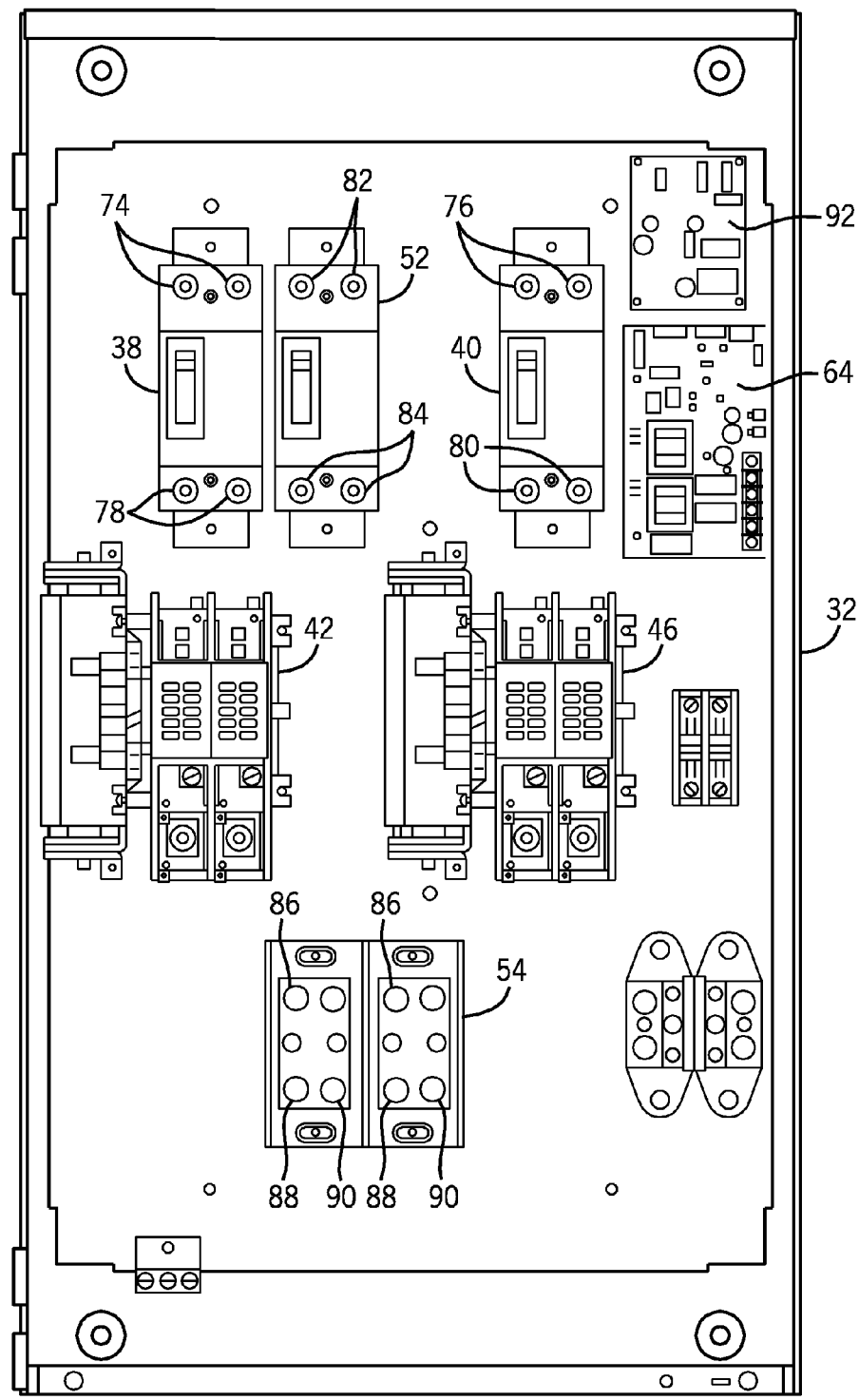
FIG. 4 is a front view of the transfer switch shown in FIG. 3.

FIGS. 3 and 4 illustrate a specific physical configuration of the transfer switch 14 of the present disclosure. The transfer switch 14 includes the enclosed housing 32 having a front panel 70. The combination of the housing 32 and the front panel 70 enclose a mounting platform 72 onto which the operating components of the transfer switch 14 are mounted. As described previously with reference to FIG. 2, circuit breaker 38 receives the first primary output from the primary power source at a pair of input terminals 74. Likewise, circuit breaker 40 receives the second primary output from the primary power source at the input terminals 76. The output terminals 78, 80 of the circuit breakers 38, 40 are connected to the first transfer switch contactor 42 and the second transfer switch contactor 46 as shown in FIG. 2.

Referring back to FIG. 4, the secondary power source is connected to the input terminals 82 of the circuit breaker 52. Output terminals 84 are connected to input terminals 86 of the splitter 54. Output terminals 88 are connected to the first transfer switch contactor 42 while the output terminals 90 are connected to the second transfer switch contactor 46.

As previously described, the position of each of the first and second transfer switch contactors 42, 46 are controlled by control signals generated by the single controller 64. In the embodiment shown in FIG. 4, the controller 64 is contained on a circuit board mounted within the housing 32 and operates in the manner to be described below to control the position of the first and second transfer switch contacts 42, 46.

In addition to the transfer switch controller 64, a load management controller 92 is also contained within the housing 32. The load management controller 92 functions to selectively shed loads from the power distribution system depending upon the amount of power drawn by the loads and the power available from the generator. The details of the load management control board can vary depending upon the particular power distribution system. The details of the load management controller will not be described since these functions are not part of the present disclosure.

In the embodiment shown in the Figures, the power distribution system 10 includes a pair of circuit breakers 38, 40 associated with the primary power source and a circuit breaker 52 associated with the secondary power source 26. Although these circuit breakers are desirable, it is contemplated that the circuit breakers 38, 40 and 52 could be eliminated from the system shown and described while still operating within the scope of the present disclosure. Further, although the circuit breakers 38, 40 and 52 are shown within the housing 32, it is contemplated that the circuit breakers could be removed from the housing 32 while also operating within the scope of the present disclosure.

In the embodiment shown in FIG. 2, both the first transfer switch contactor 42 and the second transfer switch contactor 46 are contactors configured such that the internal contacts within each contactor are biased to a default position in which the contactors assume the first position. As described previously, when the first and second transfer switch contactors 42, 46 are in the first position, the primary power supply 24 is directed to the distribution panels 11 and 12. Thus, if the contactors 42, 46 fail or the controller 64 malfunctions, the first and second transfer switch contactors 42, 46 assume a default position in which the primary power source 24 is connected to the distribution panels 11 and 12. This type of biasing is preferable as compared to a situation in which the first transfer switch contactor 42 and the second transfer switch contactor 46 would remain in the second position and connect the secondary power source 26 to the distribution panels 11 and 12. Since it is likely that the primary power source 24 will be only briefly interrupted, a default position in which the first and second transfer switch contactors 42, 46 remain in the first position will result in power being supplied to the distribution panels 11 and 12 when the utility source returns.

Figure 5:
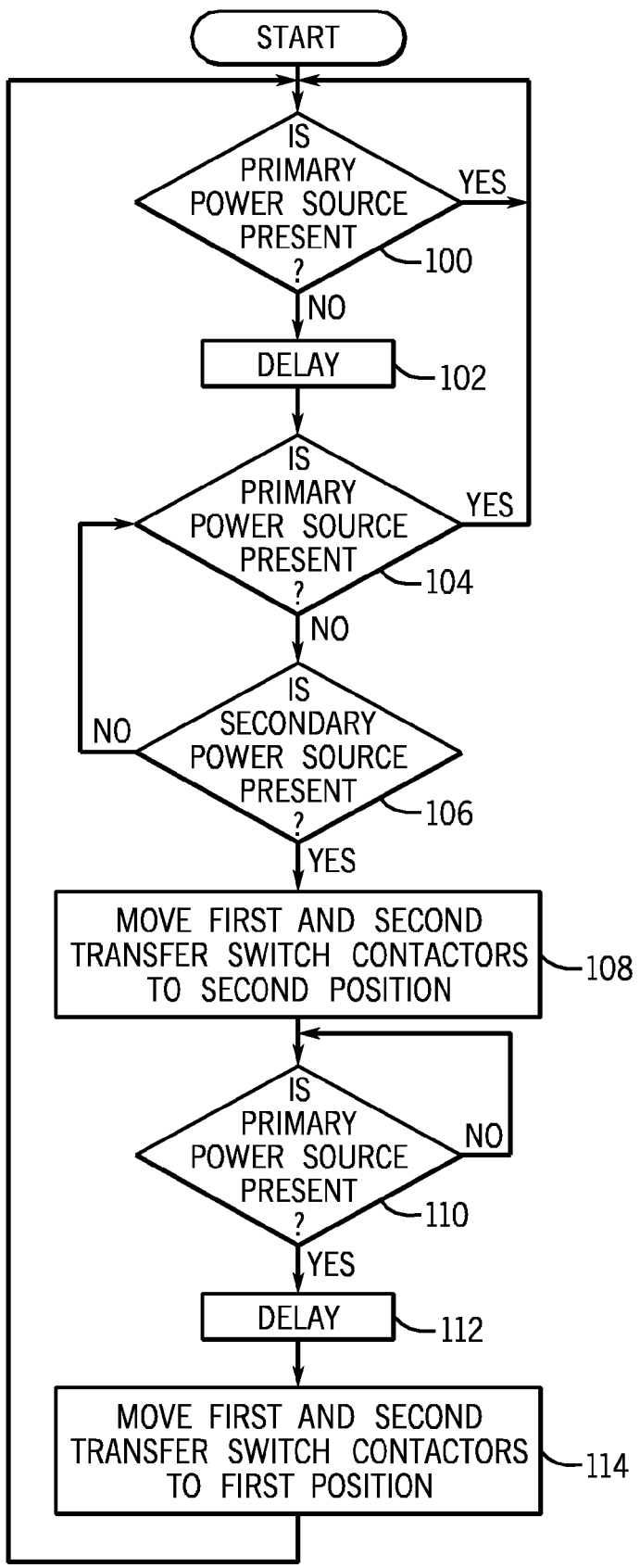
FIG. 5 is a flowchart illustrating the operating sequence carried out by the transfer switch of the present disclosure.

FIG. 5 illustrates the operating sequence carried out by the single controller 64 shown in FIG. 2. Initially, the controller determines in step 100 whether the primary power source is present. If the primary power source is present, the controller continues to monitor for the presence of the primary power source and the first and second transfer switch contactors remain in the first position in which the primary power source is supplied to the distribution panels.

If the controller determines in step 100 that the primary power source is no longer present, the controller initially delays in step 102 before the system determines again whether the primary power source is present in step 104. The delay step insures that the system does not transfer power from the primary power source to the secondary power source upon a very brief interruption in the utility power supply.

If the primary power source is not present after the delay, the controller determines in step 106 whether the secondary power source is present. In this step, the controller 64 determines whether the secondary power source, such as the standby generator, is activated and able to supply electrical power to the loads of the residence serviced by the transfer panel.

If the secondary power source is present and ready to supply power, the controller generates control signals to move the first and second transfer switch contactors to the second position, as shown in step 108. When the first and second transfer switch contactors are in the second position, power from the secondary power source is supplied to the power distribution panel. The controller keeps the first and second transfer switch contactors in the second position until the system determines in step 110 that the primary power source is again present.

When the controller determines that the primary power source is present in step 110, the system again delays in step 112 before moving the first and second transfer switch contactors to the first position in step 114. Once again, the delay required in step 112 insures that the primary power source has returned prior to switching from the secondary source back to the primary power source.

We claim:

1. A transfer switch for use in a backup power management system including a primary power source, a primary power splitter that receives power from the primary power source and divides the power into a first primary output and a second primary output, a secondary power source, first and second distribution panels and a plurality of loads, comprising:
    a secondary power splitter that receives power from the secondary power source and divides the power into a first secondary output and a second secondary output;
    a first transfer switch contactor that receives the first primary output and the first secondary output, wherein the first transfer switch contactor is movable between a first position in which the first primary output is provided to the first distribution panel and a second position in which the first secondary output is provided to the first distribution panel;
    a second transfer switch contactor that receives the second primary output and the second secondary output, wherein the second transfer switch contactor is movable between a first position in which the second primary output is provided to the second distribution panel and a second position in which the second secondary output is provided to the second distribution panel; and
    a single controller connected to both the first and second transfer switch contactors, wherein the controller controls the movement of both the first and second transfer switch contactors between the first and second positions.

2. The transfer switch of claim 1 wherein the first and second transfer switch contactor and the single controller are contained within a housing.

3. The transfer switch of claim 2 further comprising a secondary power circuit breaker positioned between the secondary power source and the secondary power splitter.

4. The transfer switch of claim 3 wherein the secondary power circuit breaker is contained within the housing.

5. The transfer switch of claim 2 further comprising a first primary circuit breaker positioned between the primary power splitter and the first transfer switch contactor and a second primary circuit breaker positioned between the primary power splitter and the second transfer switch contactor.

6. The transfer switch of claim 5 wherein the first and second primary circuit breakers are located within the housing.

7. The transfer switch of claim 1 wherein the first and second transfer switch contactors move between the first and second positions together.

8. A backup power management system connectable to a utility power source having a primary power splitter that divides the utility power source into a first primary output and a second primary output and provides power to a plurality of loads through a first distribution panel and a second distribution panel, the backup power management system comprising:
    a backup generator;
    a secondary power splitter that receives power from the backup generator and divides the power into a first secondary output and a second secondary output;
    a first transfer switch contactor connected to the primary power splitter to receive the first primary output and connected to the secondary power splitter to receive the first secondary output, wherein the first transfer switch contactor is movable between a first position in which the first primary output is provided to the first distribution panel and a second position in which the first secondary output is provided to the first distribution panel;
    a second transfer switch contactor connected to the primary power splitter to receive the second primary output and connected to the secondary power splitter to receive the second secondary output, wherein the second transfer switch contactor is movable between a first position in which the second primary output is provided to the second distribution panel and a second position in which the second secondary output is provided to the second distribution panel; and
    a single controller connected to both the first and second transfer switch contactors, wherein the controller controls the movement of both the first and second transfer switch contactors between the first and second positions.

9. The backup power arrangement of claim 8 wherein the first and second transfer switch contactors and the single controller are contained within a housing.

10. The backup power arrangement of claim 9 further comprising a secondary power circuit breaker positioned between the secondary power source and the secondary power splitter.

11. The backup power arrangement of claim 10 wherein the secondary power circuit breaker is contained within the housing.

12. The backup power arrangement of claim 9 further comprising a first primary circuit breaker positioned between the primary power splitter and the first transfer switch contactor and a second primary circuit breaker positioned between the primary power splitter and the second transfer switch contactor.

13. The backup power arrangement of claim 12 wherein the first and second primary circuit breakers are located within the housing.

14. The backup power arrangement of claim 8 wherein the first and second transfer switch contactors move between the first and second positions together.

15. A method of operating a power management system that provides power from a primary power source and a secondary power source to a plurality of loads through at least one distribution panel, the method comprising the steps of:
    providing a single controller within a housing;
    receiving first and second primary outputs from the primary power source;
    dividing the secondary power source into first and second secondary power outputs;
    generating a signal from the controller to both a first transfer switch contactor and a second transfer switch contactor to move the first and second transfer switch contactors from a first position to a second position upon loss of the primary power source; and
    generating a signal from the controller to both the first transfer switch contactor and the second transfer switch contactor to move the first and second transfer switch contactors from the second position to the first position upon return of the primary power source.

16. The method of claim 15 wherein the first and second primary outputs are supplied to the at least one distribution panel through the first and second transfer switch contactors when the first and second transfer switch contactors are in the first position.

17. The method of claim 15 wherein the first and second secondary power outputs are supplied to the at least one distribution panel through the first and second transfer switch contactors when the first and second transfer switch contactors are in the second position.

18. The method of claim 15 further comprising the steps of:
positioning a circuit breaker between the primary power source and the first and second transfer switch contactors; and
positioning a circuit breaker between the secondary power source and the first and second transfer switch contactors.

19. The method of claim 16 wherein the first and second primary outputs are supplied to a first distribution panel and a second distribution panel when the first and second transfer switch contactors are in the first position and the first and second secondary outputs are supplied to the first and second distribution panels when the first and second transfer switch contactors are in the second position.

20. The method of claim 19 wherein the first and second transfer switch contactors move between the first and second positions together.

* * * * *